Dec. 18, 1951     R. F. FRENCH ET AL     2,579,378
OPHTHALMIC MOUNTING

Filed June 21, 1948     2 SHEETS—SHEET 1

INVENTORS
REGINALD FRANK FRENCH,
HENRY ROBERT SADLER,

By John B. Brady
ATTORNEY

Dec. 18, 1951     R. F. FRENCH ET AL     2,579,378
OPHTHALMIC MOUNTING

Filed June 21, 1948     2 SHEETS—SHEET 2

INVENTORS
REGINALD FRANK FRENCH,
HENRY ROBERT SADLER,

By John B. Brady
ATTORNEY

Patented Dec. 18, 1951

2,579,378

UNITED STATES PATENT OFFICE 2,579,378

OPHTHALMIC MOUNTING

Reginald Frank French, Ilford, and Henry Robert Sadler, London, England

Application June 21, 1948, Serial No. 34,204
In Great Britain January 14, 1947

5 Claims. (Cl. 88—41)

This invention relates to the type of ophthalmic mounting which comprises a frame presenting two relatively long and slender temple supports, an intermediate or central nasal bridge, and nose pad supporting arms and in which each temple support, the bridge, and each nose pad supporting arm are made as three finished separate integers for interconnection and detachable securement with the aid of a screw or the like.

Ophthalmic mountings of this type enable the optician to express his art in frame fitting combined with aesthetic desires in that the separate integers may be of different metals and/or colours; moreover the optician is able to replace broken parts without the necessity for soldering, brazing, welding or adhesionally bonding.

Ophthalmic mountings of the stated type have already been proposed in which each nose pad supporting arm has been made with a rectangular box to receive juxtaposed end portions of the pertaining temple support and of the bridge.

Our invention provides an improved and simplified ophthalmic mounting of the stated type in which the integers of the frame manifest advantageous features of novelty.

In accordance with the invention two of the three interconnectable integers, that is, the temple support, the bridge and the nose pad supporting arm have aligned slots while the third integer has a tongue or tongues to engage the said slots, the part being retained in engagement by a screw or the like. This arrangement enables a rigid, non-rocking assembly to be easily attained whilst reducing to the minimum the total wall thickness of the integers at the place of the connection.

Preferably each temple support and each limb of the bridge have through slots, and each nose pad supporting arm has a tongue to pass through the said slots.

In accordance with a further feature of the invention the tongue terminates in a screw-threaded eye and constitutes a single strap for mounting the pertaining lens, an arrangement which avoids the necessity for cutting-in the lens or the lens rim at the nasal portion to allow for fitting between the usual narrowly spaced pair of front and back straps.

By way of non-limitative example one embodiment of the invention is illustrated on the accompanying drawing, whereon:

Figure 1:
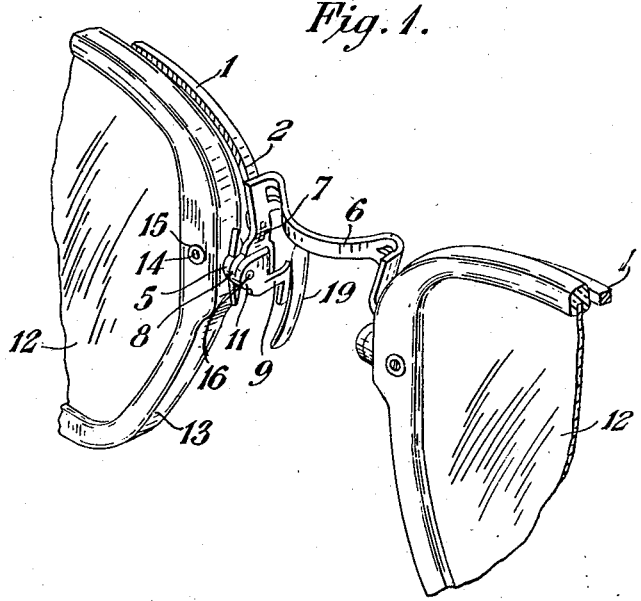
Fig. 1 is a fragmentary front perspective view of this embodiment.
Figure 1A:
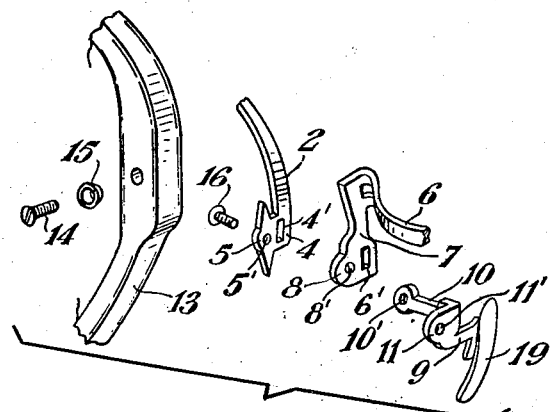
Fig. 1a is an exploded view showing the parts of the assembly shown in Fig. 1 in juxtaopposed positions.
Figure 2:
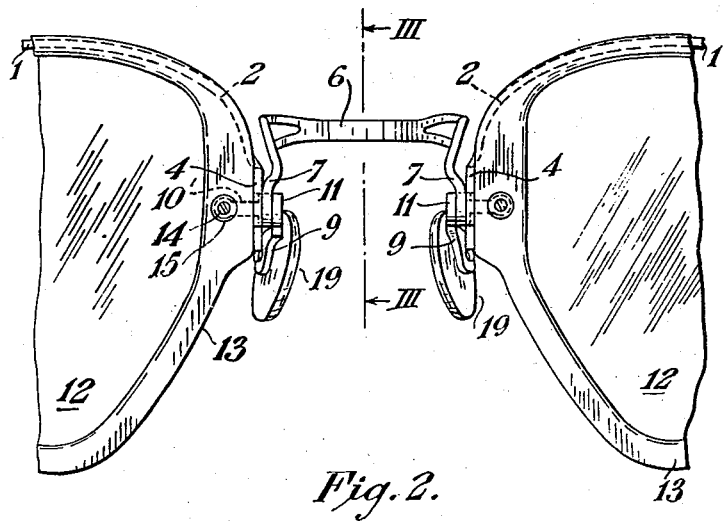
Fig. 2 is a fragmentary rear view of the same.
Figures 3, 4:
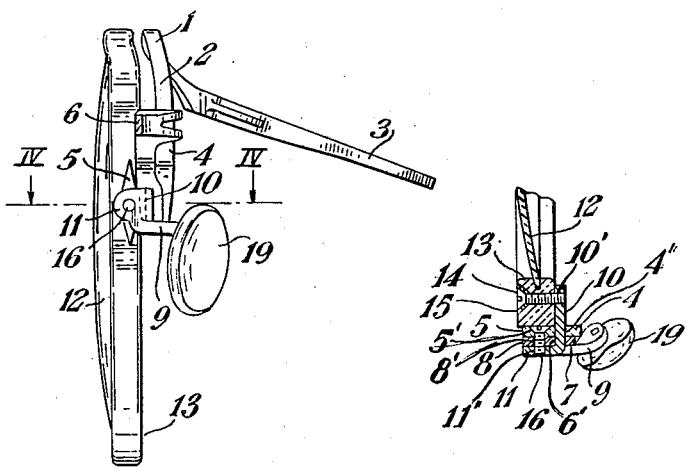
Fig. 3 represents a section on the line III—III of Fig. 2.
Fig. 4 represents a section on the line IV—IV of Fig. 3.

In the illustrated embodiment each temple support 1 presents a downwardly curved nasal portion 2 at one end whilst its other end is finished in the usual manner for pivotal attachment of a temple 3 (Fig. 3). However, the said curved nasal portion 2 has a flat extremity 4 of substantially oblong shape which projects forward from the temple support and through which a slot 4' is made (Fig. 4), whilst adjacent the slot is a lug 5 (Fig. 1) having a screw opening 5'. Similarly, the nasal bridge 6 is made, at each side, with a flat extremity 7, slotted at 6' (Fig. 4) and also provided with a lug 8 having a screw opening 8'.

From each nose pad supporting arm 9 there projects, horizontally from its upper end, a tongue 10 of oblong cross section which is adapted to pass through the aforesaid slots in the temple support and bridge and which constitutes a single lens strap to bear against the back of the lens, or the lens rim if a rim is provided. Adjacent this tongue the arm has a lug 11 with a screw-threaded opening 11'.

Temple supports 1, bridges 6 and nose pad supporting arms 9 incorporating the described features may be sold separately and stocked in various sizes by the practising or retailing optician.

To make up an ophthalmic mounting the optician selects a pair (right and left) of temple supports 1, a bridge 6, and a pair (right and left) of nose pad supporting arms 9 which he then assembles as follows:

First the bridge 6 is placed against one temple support 1, with their aforesaid slots and lugs in alignment, then the tongue 10 of the corresponding nose pad supporting arm 9 is pushed through the aligned slots 4' and 6' in these members until the arm itself bears against the slotted portion of the bridge 6, then a screw 11 is passed through the aligned holes 5' and 8' of the lugs 5 and 8 and threaded into the screw-threaded opening 11' of the lug 11 and tightened up to clamp the three members 6, 1, 9 together. In like manner the other temple support and nose pad supporting arm are assembled and secured at the other side of the bridge to complete the mounting.

Each lens is secured by the tongue 10 of the corresponding nose pad supporting arm 9 which, as already mentioned, constitutes a single strap at the back of the lens. Through a hole in the lens 12 or in the lens rim 13 if a rim is provided as shown a screw 14, on to which a washer 15 has first been placed, is threaded into engagement with a screw-threaded hole formed in the tongue 10.

The separate integers are easy to make and to assemble since the interconnecting portions are of flat or plate-like form; the thickness at the connection (see Fig. 4) is reduced to the minimum, that is to the total thickness of the three juxtaposed flat portions of the connected integers; the head of the retaining screw 16 abuts the lens rim 13 (or the lens if there is no rim) and cannot accidentally loosen or fall out; the tongue 10 and slotted connection affords rigidity and absence of rocking and requires the use of only a single securing screw 16; the tongue 10 serves also as a back strap for the lens or lens rim and enables any thickness of lens to be employed without adjustment as necessary when both a front and a back strap are provided; and the single back strap afforded by the tongue eliminates strain on the lens.

We claim:

1. An ophthalmic mounting comprising components which include a pair of brace bar elements terminating in relatively flattened depending nasal extremities, a bridge terminating in integrally connected coacting relatively flattened extremities establishing abutting relation with the relatively flattened extremities of said brace bar elements, each of said extremities having aligned slots therein, nose pad supporting arms having relatively flattened extremities disposed in superimposed relation to the aforesaid relatively flattened extremities, integrally formed tongues on the extremities of said nose pad supporting arms, said tongues being offset with respect to said nose pad supporting arms and extending transversely through the aligned slots in the others of said extremities and forming lens mounting means and means for detachably securing said components together.

2. An ophthalmic mounting as set forth in claim 1 in which said tongues are non-circular in section and wherein said slots have sections conforming with the section of said tongues for establishing a non-rotative assembly for supporting lenses.

3. An ophthalmic mounting as set forth in claim 1 in which said tongues each terminate in a flat screw-threaded eye substantially coplanar with said brace bar elements and screw means extending through each screw threaded eye for mounting a lens.

4. An ophthalmic mounting as set forth in claim 1 in which said integrally formed tongues are connected with the extremities of said nose pad supporting arms and project through the aligned slots in the relatively flattened extremities of said bridge and said brace bar elements successively in the order named.

5. An ophthalmic mounting as set forth in claim 1 in which the means for detachably securing said components together comprise headed screws which enter apertures in the relatively flattened depending nasal extremities of the brace bar elements adjacent the slots therein and extend through aligned apertures in the coacting relatively flattened extremities of said bridge and fasten in screw threaded apertures formed in the relatively flattened extremities of said nose pad supporting arms, the heads of said headed screws terminating adjacent and in substantial alignment with the edges of the lenses supported by the lens mounting means.

REGINALD FRANK FRENCH.
HENRY ROBERT SADLER.

REFERENCES CITED

The following references are of record in the file of this patent:

UNITED STATES PATENTS

| Number | Name | Date |
|---|---|---|
| 2,236,565 | Cozzens | Apr. 1, 1941 |
| 2,239,575 | Schwab | Apr. 22, 1941 |
| 2,268,908 | Shockey | Jan. 6, 1942 |
| 2,330,249 | Splaine | Sept. 28, 1943 |
| 2,352,973 | Riller | July 4, 1944 |
| 2,362,725 | Slotsky | Nov. 14, 1944 |
| 2,366,659 | Uhlemann et al. | Jan. 2, 1945 |
| 2,371,910 | Nerney | Mar. 20, 1945 |
| 2,380,638 | D'Urbano | July 31, 1945 |
| 2,382,980 | Eaton et al. | Aug. 21, 1945 |
| 2,458,963 | Stevens | Jan. 11, 1949 |